(12) United States Patent
Zhang

(10) Patent No.: US 11,836,958 B2
(45) Date of Patent: Dec. 5, 2023

(54) AUTOMATICALLY DETECTING AND ISOLATING OBJECTS IN IMAGES

(71) Applicant: Element AI Inc., Montreal (CA)

(72) Inventor: Ying Zhang, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 313 days.

(21) Appl. No.: 17/279,727

(22) PCT Filed: Sep. 24, 2019

(86) PCT No.: PCT/CA2019/051364
§ 371 (c)(1),
(2) Date: Mar. 25, 2021

(87) PCT Pub. No.: WO2020/061691
PCT Pub. Date: Apr. 2, 2020

(65) Prior Publication Data
US 2022/0036108 A1   Feb. 3, 2022

Related U.S. Application Data

(60) Provisional application No. 62/736,092, filed on Sep. 25, 2018.

(51) Int. Cl.
G06V 10/25       (2022.01)
G06V 20/62       (2022.01)
G06N 3/02        (2006.01)
G06F 18/2431     (2023.01)
G06V 10/764      (2022.01)
(Continued)

(52) U.S. Cl.
CPC .......... *G06V 10/25* (2022.01); *G06F 18/2431* (2023.01); *G06N 3/02* (2013.01); *G06V 10/28* (2022.01); *G06V 10/764* (2022.01); *G06V 10/82* (2022.01); *G06V 20/62* (2022.01)

(58) Field of Classification Search
CPC ...... G06V 10/25; G06V 10/28; G06V 10/764; G06V 10/82; G06V 20/62; G06F 18/2431; G06N 3/02
See application file for complete search history.

(56) References Cited

U.S. PATENT DOCUMENTS

2012/0219222 A1*  8/2012  Ferman ............... G06V 30/147
                                                     382/173
2017/0220859 A1*  8/2017  Grams .................. H04N 1/387
2017/0287346 A1* 10/2017  Yadav .................. G09B 5/065

* cited by examiner

*Primary Examiner* — Jianxun Yang
(74) *Attorney, Agent, or Firm* — Gowling WLG (Canada) LLP

(57) ABSTRACT

Systems and methods for automatically detecting and isolating objects in images. An image containing at least one object of interest is segmented by a segmentation module, based on the class of object each pixel of the image depicts. A bounding module then determines coordinates of a predetermined shape that covers at least a portion of the at least one object of interest. An application module then applies a bounding box having those coordinates and having the predetermined shape to the original image. In some embodiments, the coordinates are determined based on a mask layer that is based on the object classes in the image. In other embodiments, the coordinates are determined based on the mask layer and on an edge mask layer. Some embodiments comprise at least one neural network. In some embodiments, the objects of interest are text objects.

23 Claims, 9 Drawing Sheets

(51) Int. Cl.
*G06V 10/82* (2022.01)
*G06V 10/28* (2022.01)

AUTOMATICALLY DETECTING AND ISOLATING OBJECTS IN IMAGES

TECHNICAL FIELD

The present invention relates to isolating objects in images. More specifically, the present invention relates to automatically detecting and isolating text and other objects.

BACKGROUND

Optical character recognition (OCR) is today a field of great interest. As is well-known, OCR is a process in which text is digitally encoded based on digital images containing that text. The text may be printed or typed, and in some cases even handwritten. OCR techniques are used in digital data entry, text mining, and many other machine reading applications.

One component of OCR is text detection. That is, before the individual characters in a certain piece of text can be recognized, that piece of text must be identified as being 'text'. In many OCR studies, text detection has been a trivial task: these studies often use low-resolution images with predictably located text. Text detection based on real-world data, however, can be far more complex. Real-world images of text-rich documents may be damaged and/or feature text in unpredictable locations. Additionally, 'natural-scene images' (for instance, images of streets) may contain very little text relative to the overall content of the image. Text detection is, additionally, often more challenging than other forms of object detection within images. For instance, many objects within images have known or predictable size ratios. As a result, partial images of such objects may be used to infer the remainder of those objects, even when that remainder is occluded by other items in the image. Full text objects, on the other hand, cannot be accurately inferred from portions thereof, as the precise content and size of a text object will vary depending on the word or phrase.

Thus, real-world text detection presents many challenges for machine vision systems. Many techniques for real-world text detection have been developed in response to these challenges. One group of such techniques uses so-called 'region proposal networks'. Region proposal networks comprise multiple networks: one network generates a large number of proposed regions in an image in which text may be found, and another network examines each proposed region for text. Region-proposal-generation can be computationally expensive and create bottlenecks. A model known as 'faster-RCNN' (Ren et al, "Faster R-CNN: Towards Real-Time Object detection with Region Proposal Networks", arXiv:1506.01497v3 [cs.CV], 2016, the entirety of which is herein incorporated by reference) avoids some of the pitfalls of other region-proposal-network methods, and is considered state-of-the-art.

Other techniques for text detection rely on semantic segmentation methods, which classify images pixel-by-pixel. Typical semantic segmentation methods for text detection classify image pixels as either 'text' or 'not text'. These methods can have advantages over region proposal networks in some cases. However, such semantic segmentation models have difficulty separating different regions of 'glued text'; that is, they struggle to identify breaks between different pieces of text.

Additionally, both region-proposal networks and semantic segmentation techniques generally focus on either text-rich images of documents or on natural-scene images, in which text is typically sparse. There is as yet no way to handle both text-rich images and text-sparse images using a single system or method. As is clear from the above, there is a need for methods and systems that remedy the deficiencies of the prior art.

Further, although text detection has specific challenges, there is also a need for more flexible and robust methods and systems for general object detection. That is, there is a need for methods and systems that can be generalized to detect multiple different kinds of objects for different implementations.

SUMMARY

The present invention provides systems and methods for automatically detecting and isolating objects in images. An image containing at least one object of interest is segmented by a segmentation module, based on the class of object each pixel of the image depicts. A bounding module then determines coordinates of a predetermined shape that covers at least a portion of the at least one object of interest. An application module then applies a bounding box having those coordinates and having the predetermined shape to the original image. In some embodiments, the coordinates are determined based on a mask layer that is based on the object classes in the image. In other embodiments, the coordinates are determined based on the mask layer and on an edge mask layer. Some embodiments comprise at least one neural network. In some embodiments, the objects of interest are text objects.

In a first aspect, the present invention provides a method for isolating at least one object of interest in an image, the method comprising:
   (a) receiving said image;
   (b) passing said image through a segmentation module to thereby produce a segmented image, wherein contents of said segmented image are classified into at least two object classes, and wherein said at least one object of interest is a member of one of said at least two object classes;
   (c) identifying a location of said at least one object of interest within said segmented image;
   (d) determining coordinates of a predetermined shape surrounding at least a portion of said at least one object of interest at said location; and
   (e) applying a bounding box having said predetermined shape and having said coordinates to said image, to thereby isolate said at least one object of interest from said image.

In a second aspect, the present invention provides a system for isolating at least one object of interest in an image, the system comprising:
   a segmentation module for receiving said image and for segmenting said image to thereby produce a segmented image, wherein contents of said segmented image are classified into at least two object classes, wherein said at least one object of interest is a member of one of said at least two object classes;
   a bounding module for identifying a location of said at least one object of interest based on said segmented image and for determining coordinates of a predetermined shape surrounding at least a portion of said at least one object of interest at said location; and
   an application module for applying a bounding box having said predetermined shape and having said coordinates to said image, to thereby isolate said at least one object of interest from said image.

In a third aspect, the present invention provides non-transitory computer-readable media having encoded thereon computer-readable and computer-executable instructions that, when executed, implement a method for isolating at least one object of interest in an image, the method comprising:

(a) receiving said image;
(b) passing said image through a segmentation module to thereby produce a segmented image, wherein contents of said segmented image are classified into at least two object classes, and wherein said at least one object of interest is a member of one of said at least two object classes;
(c) identifying a location of said at least one object of interest within said segmented image;
(d) determining coordinates of a predetermined shape surround at least a portion of said object of interest at said location; and
(e) applying a bounding box having said predetermined shape and having said coordinates to said image to thereby isolate said at least one object of interest from said image.

BRIEF DESCRIPTION OF THE DRAWINGS

The present invention will now be described by reference to the following figures, in which identical reference numerals refer to identical elements and in which.

DETAILED DESCRIPTION

The present invention provides systems and methods for isolating objects of interest in digital images and in videos. Additionally, the images and/or videos may have two or more dimensions. (For clarity, all uses of the term 'image' herein should be construed to include any of the following: 2D images; 3D images; 2D videos and video frame images; 3D videos and video frame images; and 'images' or data objects in higher dimensions.) The objects of interest within the images and/or videos may be text or other objects. The objects of interest are isolated by the automatic application of at least one bounding box. The present invention is based on semantic segmentation principles and can process both text-rich and text-sparse images.

Figure 1:
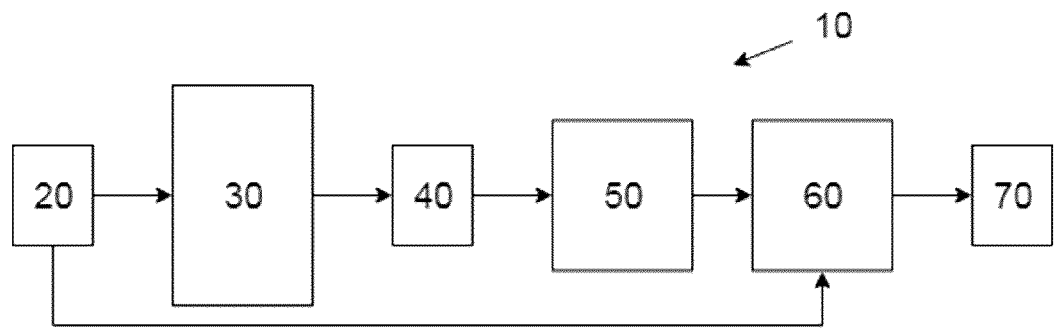
FIG. 1 is a block diagram illustrating a system according to one aspect of the invention.

Referring now to FIG. 1, a block diagram illustrating a system according to one aspect of the invention is illustrated. The system 10 takes an image 20 as an input to a segmentation module 30. The image 20 contains at least one object of interest. The segmentation module 30 processes the image 20 and, based on the at least one object of interest, produces a segmented image 40. This segmented image 40 is then passed to a bounding module 50, which identifies a location of the at least one object of interest within the segmented image 40 and determines coordinates of a predetermined shape surrounding at least a portion of the object of interest at that location. The coordinates are then passed to an application module 60. This application module 60 then applies a bounding box having the predetermined shape and having those coordinates to the original image 20. The output of the application module 60 is thus an output image 70 to which at least one bounding box of the predetermined shape is applied. The at least one bounding box surrounds at least a portion of the at least one object of interest, and thus isolates the at least one object of interest from the rest of the output image 70.

The coordinates determined by the bounding module 50 may take various forms. Depending on the implementation and on the predetermined shape chosen, the coordinates may comprise: coordinates for vertices of the predetermined shape; an array of all points along the predetermined shape; or any other identifying coordinates. For instance, if the predetermined shape chosen is a rectangle, the coordinates output from the bounding module 50 may be the four vertices of the appropriate rectangle. (The parameters that satisfy the 'appropriate' rectangle or other shape will be discussed in more detail below.) As an alternative, the coordinates for a rectangle might be represented by a tuple of the form ('top side location', 'left side location', 'rectangle width', 'rectangle height'). If, however, the predetermined shape is a circle, the coordinates may be a centre and a radius value. As should be clear, many other coordinate representations are possible.

The segmentation module 30 segments the image 20 by classifying each pixel of the image 20 into one of at least two object classes. The classifying process is based on what kind of object a given pixel depicts. Each object of interest sought is a member of one of the at least two classes. For instance, if the objects of interest to be isolated are text objects, the segmentation module 30 may segment the image 20 by classifying each pixel into either a 'text' class or a 'not text' class.

The segmentation module 30 may be a rules-based module or a neural network. Neural networks have previously shown efficiencies over rules-based systems for segmentation tasks. Nevertheless, for some implementations, a rule-based system may be preferable. Additionally, in some implementations, the segmentation module 30 may comprise both rules-based and neural network elements.

In some implementations, the segmentation module 30 may be a 'fully convolutional neural network'. The use of fully convolutional neural networks for this kind of segmentation is well-known in the art (see, for instance, Shelhamer, Long, and Darrell, "Fully Convolutional Networks for Semantic Segmentation", CVPR 2016, the entirety of which is herein incorporated by reference). In one implementation, the segmentation module 30 can be based on a fully convolutional network framework called PSPNet. However, depending on the implementation, many other neural network architectures may be used, including for example Deeplab or Tiramisu.

Once the segmentation module 30 has produced the segmented image 40, that segmented image 40 is passed to the bounding module 50. Based on the pixel classifications in the segmented image 40, the bounding module 50 identifies a location of at least one object of interest within the segmented image 40. After that location is identified, the bounding module 40 determines coordinates of a predetermined shape that surrounds at least a portion of the object of interest at that location.

Preferably, the predetermined shape is based on the general shape of the objects of interest sought. For instance, words and sentences in the English language and in other Latin-alphabet-based languages are generally arranged in relatively rectangular horizontal arrangements. Thus, if the objects to be isolated are English-language text objects, the predetermined shape chosen may be a rectangle. The rectangles may be horizontal, vertical, or at an angle to an axis. More broadly, to account for internal angles and font and/or size variations, the predetermined shape for text objects may be a parallelogram.

For clarity, of course, the present invention is not restricted to isolating English-language text objects, or to isolating Latin-alphabet text objects. For additional clarity, note that the at least one bounding box does not have to be rectangular. Though referred to as a 'box', the bounding box may be any predetermined and relatively consistent shape. Many objects of possible interest (e.g., buildings) have relatively regular shapes. Thus, even rules-based implementations of the present invention could be applied to such objects by adjusting the predetermined shape.

It should be noted that, like the segmentation module 30, the bounding module 50 may be a rules-based module or a neural network. Additionally, in some implementations, the bounding module 50 may comprise both rules-based and neural network elements.

Figure 2:
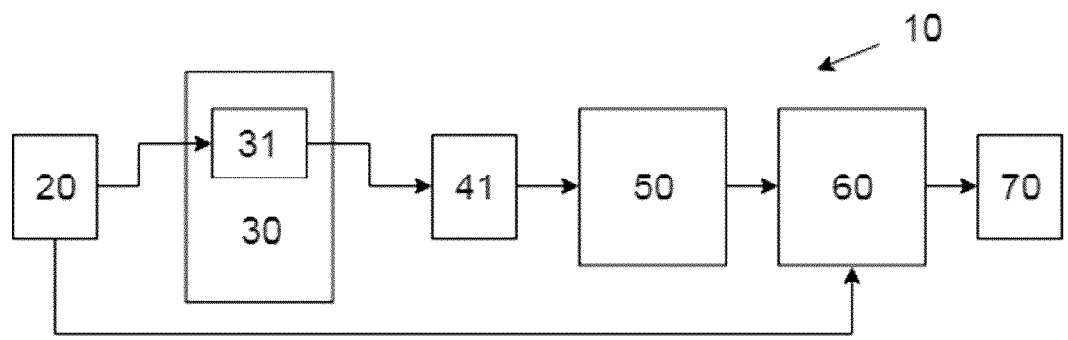
FIG. 2 is another block diagram illustrating an embodiment of the system of FIG. 1.

Another embodiment of the system of the present invention is shown in FIG. 2. In this embodiment, the segmentation module 30 comprises a mask generation module 31. The segmentation module 30 segments the original image 20, as in FIG. 1, but the segmented image 40 thereby produced is not passed to the bounding module 50. Rather, the segmented image 40 is passed to the mask generation module 31 that is inside the segmentation module. The mask generation module 31 generates a mask layer 41. This mask layer is based on the object class information produced by the segmentation module 30, as will be described below.

In one embodiment, the mask layer 41 is an array of 'mask pixels', wherein each mask layer pixel corresponds to at least one pixel in the original image. In some implementations, the mask layer is a pixel array having the same size as the original image 20. In other implementations, however, each mask pixel corresponds to more than one image pixel (that is, to more than one pixel from the original image 20). In still other implementations, multiple mask pixels may correspond to a single image pixel.

In some implementations, the mask layer 41 may be generated according to pixel-wise classification methods. In such cases, the mask layer 41 is generated as an array of mask pixels, wherein each mask pixel is assigned an object value. The object value of a specific mask pixel is related to an object class of a corresponding image pixel. That is, a mask pixel will have a certain object value when a corresponding image pixel has a certain object class. Note that, due to this relationship, it may be preferable to have a one-to-one relationship between the mask pixels and the image pixels; that is, to have each mask pixel correspond to one and only one image pixel. Again, however, other correspondence ratios may be used.

When there is only one possible object class of interest (e.g., text), the object value may be a binary value (that is, the object value may be one of only two possible predetermined values). In such an implementation, each object of interest will correspond to at least one mask pixel. That at least one mask pixel will have an object value that is one of the two predetermined values. Mask pixels that do not correspond to objects of interest will have the other of the two predetermined values as their object values. Thus, in this binary mask layer, each object of interest will be represented by at least one mask pixel having a first object value. More commonly, each object of interest will be represented in the binary mask layer by a group of mask pixels that all have the same first object value.

For instance, if the specific image pixel depicts text, a corresponding mask pixel may have an assigned object value of 1. On the other hand, if that specific image pixel does not depict text (i.e., if that pixel is classified as 'not text'), the corresponding mask pixel may have an assigned object value of 0. Of course, as would be clear to the person skilled in the art, the values chosen are not required to be '1' and '0'. For an image containing only two classes, it would be sufficient to select a first value as representing one class and a second value as representing the other class. The use of '1' and '0', here, is merely a conventional implementation of a two-state system and should not be seen as limiting the scope of the invention. Additionally, note that the binary mask layer 41 described herein is only one implementation of the present invention. Depending on the user's preferences and on the kind and number of objects to be detected and isolated, other methods for generating the mask layer may be preferable. For instance, if there are multiple different kinds of object to be isolated from a single image, a non-binary mask layer that uses multiple possible states may be preferred.

It should be noted, however, that this mask layer 41 will not always represent each object of interest as a discrete region. Particularly in images where objects of interest overlap, the resulting mask layer 41 may show "glued" objects (that is, a single group of mask pixels having the same object value may represent more than one object of interest). Methods for distinguishing between such objects of interest will be discussed below.

Once a mask layer 41 has been generated by the mask generation module 31, that mask layer 41 is passed to the bounding module 50. Based on the mask layer 41, for each object of interest, the bounding module 50 will then determine coordinates of at least one predetermined shape that surrounds at least a portion of the object of interest. In one implementation, the coordinates determined are those that correspond to the largest possible predetermined shape surrounding at least a portion of the object of interest, such that the contents of that largest predetermined shape (i.e., the mask pixels contained in that shape) meet at least one criterion. That at least one criterion is related to the object values of the mask pixels, and thus is also related to the object classes in the original image. As examples, possible criteria include: all the mask pixels in the shape have a same object value; a certain percentage of the mask pixels in the shape have the same object value; and pixels within a certain region of the shape have the same object value. Many other criteria are of course possible.

In some implementations, the desired coordinates may be found by a trial-and-error process. In one variant of such a process, a 'test bounding box' of random size is applied to the mask layer 41 by the bounding module 50. Depending on the contents of that test bounding box (i.e., the mask pixels the test bounding box contains), the area surrounded by the test bounding box can then be increased or decreased. Multiple ways of obtaining the largest bounding box of the predetermined shape are possible.

In a preferred approach, the following operations are applied to the test bounding box to determine the largest predetermined shape. First, when all of the mask pixels contained in the test bounding box have the same object value, the area surrounded by the test bounding box is increased. The contents of the resulting larger test bounding box are then examined against at least one predetermined criterion. On the other hand, when not all of the mask pixels contained in the test bounding box have the same object value, the area surrounded by the test bounding box is decreased, and the contents of the resulting smaller box are examined. These operations are repeated until the contents of the test bounding box meet at least one predetermined criterion, or until a maximum number of iterations is reached (thus preventing infinite loops).

The area surrounded by the test bounding box may be increased or decreased at a constant rate. As an alternative, the changes in the area surrounded by the test bounding box may be variable. For instance, the size of each successive increase or decrease may itself decrease. As another example, each successive increase or decrease may randomly vary.

Once the bounding module 50 has determined coordinates of the predetermined shape for the at least one object of interest, the coordinates are passed to the application module 60. The application module 60 then applies a bounding box having those coordinates and having the predetermined shape to the original image 20, to thereby produce an output image 70. At least one object of interest in that output image 70 is surrounded by the bounding box and thereby isolated from the rest of the image 70.

Figure 3A:
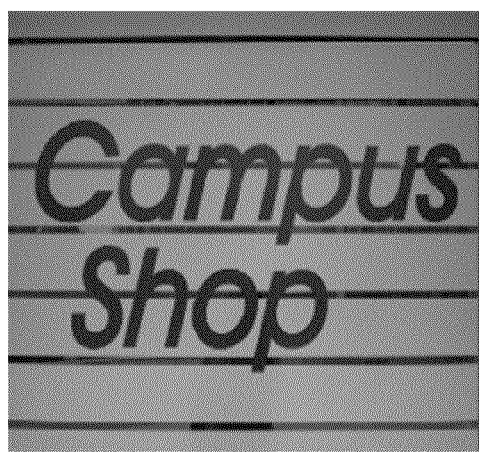
FIG. 3A is an input image that may be used by the present invention.

The mask layer generation and coordinate-determination processes detailed above will now be described with reference to figures. Referring to FIG. 3A, a possible input image for the system is shown. This image contains the words "Campus Shop" superimposed on a lined white background. These words are the objects of interest—that is, the objects to be isolated are English-language text objects. As already noted, English-language text objects are generally oriented in rectangular formations, or, more broadly, in parallelograms. As can be seen, this general property applies to this image (i.e., "Campus" and "Shop" each form a rough rectangle). Thus, for an application involving this image, the predetermined shape can be set as a parallelogram or, more specifically, as a rectangle.

Figure 3B:
FIG. 3B is a visual representation of an mask layer generated based on the image of FIG. 3A.

FIG. 3B shows a visual representation of a binary mask layer generated based on the image in FIG. 3A. A white pixel in this image indicates that a corresponding pixel in FIG. 3A contains 'text'. Black pixels, conversely, indicate that corresponding image pixels contain 'not text'. As can be seen, at this point there is no distinction between the words "Campus" and "Shop". Rather, the 'text' areas overlap into a single large region (i.e., "Campus" and "Shop" here are glued text, which may not be preferred in all applications).

As would be clear to the person of skill in the art, pixel-wise classification is probability-based. Thus, pixel-wise classifications are not always precise. As can be seen, some white pixels in FIG. 3B correspond to image pixels that are not part of any letter in FIG. 3A. However, the precise shape of the letters in FIG. 3A is not relevant to the general location of the text objects, and the present invention does not require such a degree of precision in its classifying steps.

Figure 3C:
FIG. 3C is the visual representation of FIG. 3B with a naïve bounding box applied.

FIG. 3C shows the mask layer of FIG. 3B with a naïve bounding box applied (in red). This bounding box surrounds the entire 'text' region within the image, and may be sufficient for some purposes. However, recalling FIG. 3A, it is clear that this bounding box still includes glued text and does not separate the "Campus" from the "Shop". Additionally, as can be seen, this bounding box has two large 'not text' regions in the lower corners. Various methods, such as the increase/decrease trial-and-error approach discussed above, may be used to capture "Campus" and "Shop" as separate objects. In a trial-and-error approach, the criteria for coordinate-determination may be set so that each bounding box contains a limited number of 'not text' mask pixels, or a limited proportion of 'not text' pixels relative to 'text' pixels. Additional criteria may include the relative positions of 'not text' and 'text' pixels, and be designed to prevent the 'not-text' corner blocks seen in FIG. 3C.

Figure 4:
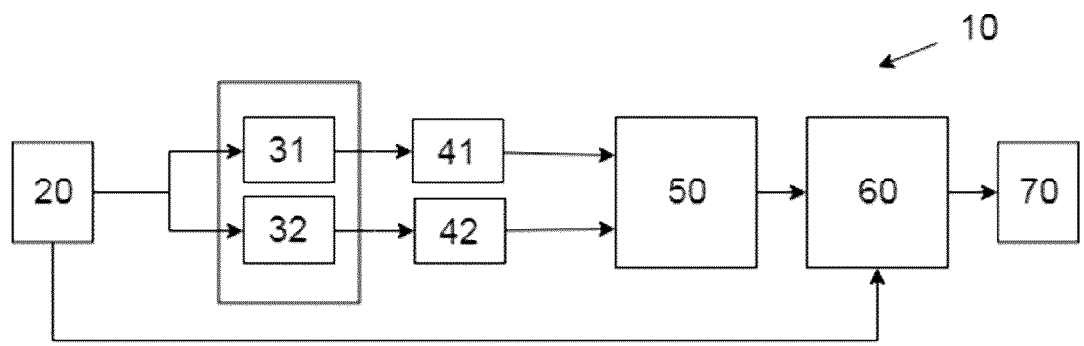
FIG. 4 is another block diagram illustrating another embodiment of the system of FIG. 1.

As mentioned above, in some implementations, the bounding module 50 may comprise a neural network that has been trained to determine appropriate coordinates for each object of interest. As another alternative to the trial-and-error coordinate determination process described above, the segmentation module 30 may be configured as in FIG. 4. As can be seen, in such a configuration, the segmentation module comprises an edge mask generation module 32, in addition to the already-described mask generation module 31. The output of this segmentation module 30 includes both a mask layer 41 and an edge mask layer 42. The mask generation module generates the mask layer 41, as also described above, while the edge mask layer 42 is generated by the edge mask generation module 32. The bounding module 50 then determines coordinates of the predetermined shape based on the mask layer 41 and on the edge mask layer 42.

The edge mask layer 42, like the mask layer 41, is based on the original image 20 and the object classes in that image, as determined by the segmentation module 30. In one implementation, the edge mask layer 42 is an array of edge mask pixels, wherein each edge mask pixel corresponds to at least one image pixel from the original image 20. Each edge mask pixel is assigned an 'edge value', which is derived from an 'edge probability'. The 'edge probability' for a specific edge mask pixel is the probability that a corresponding image pixel is on an edge of at least one object of interest. Methods of determining 'edge-ness' and edge probability are well-known in the art. Note that 'edges' include edges between objects as well as edges between kinds of objects. In some implementations, the edge probability may be used as the edge value itself. In other implementations, the edge value is simply derived from the edge probability.

Once the edge mask layer 42 is generated by the edge mask generation module 32, the mask layer 41 and the edge mask layer 42 are passed to the bounding module 50. In some implementations, again, the bounding module 50 comprises a neural network that has been trained to determine coordinates of the predetermined shapes based on mask and edge mask layers. In other implementations, however, the bounding module 50 comprises rule-based or heuristic elements. (Again, in some implementations, the bounding module 50 may comprise both neural network elements and heuristic or rule-based elements.)

In one heuristic-based embodiment, the mask layer 41 is a binary mask layer as described above, in which the higher binary value corresponds to 'object' and the lower binary value corresponds to 'not object'. The bounding module 50 then begins by processing the edge mask layer 42 to thereby produce a binary edge mask. This processing can be performed using the well-known "Otsu's method" (also called Otsu thresholding). Other well-known thresholding techniques may also be used. The binary edge mask is an array of binary pixels that uses the same binary values as the binary mask layer. Each binary pixel corresponds to a specific edge mask pixel, and is assigned a binary pixel value. (Note that, in this implementation, the mask layer 41, edge mask layer 42, and binary edge mask are all arrays of the same size, having direct one-to-one correspondences between their pixels.)

The binary pixel value is based on the edge probability associated with that specific edge mask pixel, and on a predetermined 'edge threshold'. Then, if the edge probability of a specific edge pixel is equal to or above the edge threshold, the corresponding binary pixel in the binary edge mask is assigned the higher ('object') value. Conversely, if the edge probability of a specific edge pixel is below the edge threshold, the corresponding binary pixel in the binary edge mask is assigned the lower ('not object') value. In a preferred implementation, the binary edge mask is then an array of pixels having binary pixels of either 0 or 1. (Of course, again, these numbers are merely conventional choices for a binary implementation, and should not be taken as limiting the scope of the invention. As long as the same values are used in the binary edge mask and in the binary mask layer 41, this process will be effective.)

The bounding module 50 then subtracts each binary pixel value of the binary edge mask (i.e., the value indicating edges) from the object value of the corresponding binary mask layer 41. As would be clear to the person skilled in the art, as the binary values used in the two binary masks are the same, this subtraction will only affect pixels that correspond to edges. Connected regions in the resulting subtracted mask can then be grouped and labeled, via such techniques as 'connected component labeling' (see, for instance, Woo, Otoo, and Shoshani, "Optimizing Connected Component Labeling Algorithms", SPIE Medical Imaging Conference 2005). Coordinates of the predetermined shapes can then be determined based on the connected regions. Additionally, the angles of those predetermined shapes relative to the axes of the image may be determined (based on the known predetermined shape and on the coordinates found).

Figure 6A:
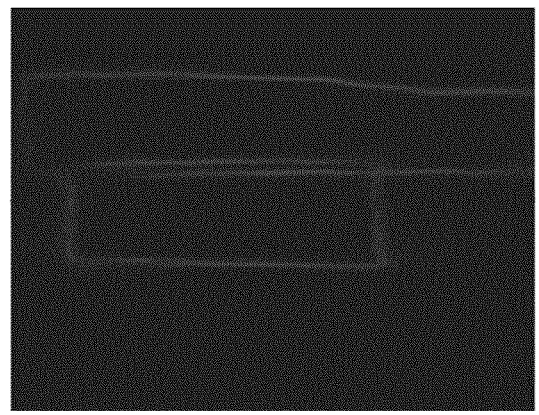
FIG. 6A is a visual representation of an edge mask layer generated based on the image of FIG. 3A.

FIGS. 6A to 6D will now be used to illustrate the use of an edge mask layer. FIG. 6A is an edge mask layer generated based on the input image in FIG. 3A. In this image, the dark purple pixels correspond to 'not-edge' image pixels and the brighter blue pixels correspond to 'edge' image pixels. (Again, as would be clear to the person skilled in the art, the probability-based pixel-wise classification methods are not always absolutely precise. However, the present invention does not require absolute precision.)

Figure 6B:
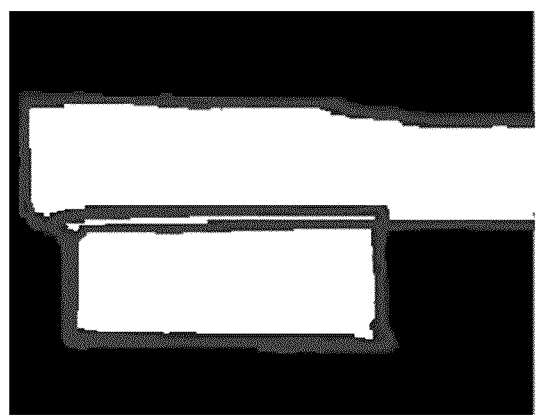
FIG. 6B shows the edges from FIG. 6A overlaid on the mask layer representation of FIG. 3B.
Figure 6C:
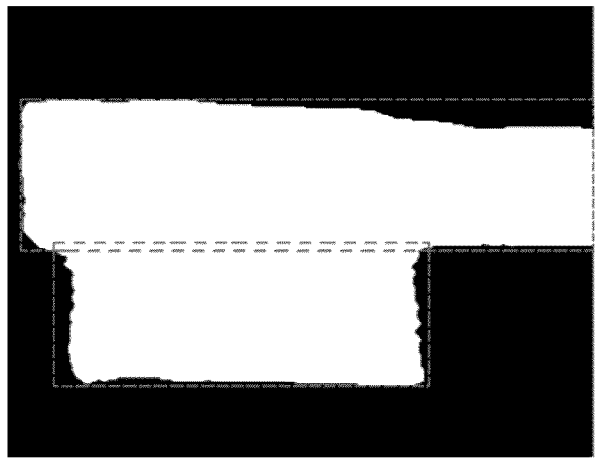
FIG. 6C shows the mask layer representation of FIG. 3B with coordinates based on the edges of FIG. 6A.
Figure 6D:
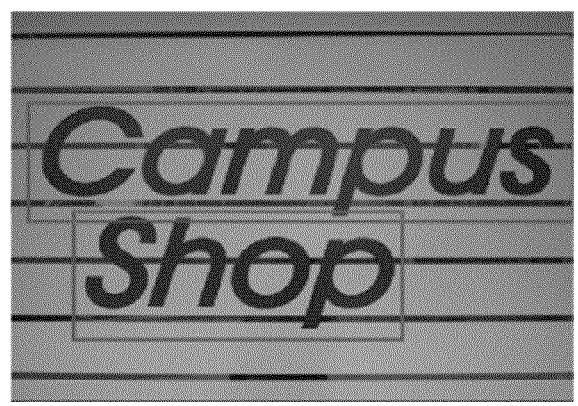
FIG. 6D is the image of FIG. 3A with bounding boxes applied.

FIG. 6B shows the mask layer of FIG. 3B with the edges from FIG. 6A overlaid. As can be seen, combining the mask layer 41 and the edge mask layer 42 allows the present invention to distinguish between kinds of objects and between individual objects of interest that may be glued. FIG. 6C shows the mask combination from FIG. 6B with refined coordinates for rectangles shown as dotted red lines. These coordinates may then be passed to the application module 60, which applies bounding boxes having those coordinates and the predetermined shape (again, in this case, rectangles) to the original image 20, to thereby produce an output image 70. FIG. 6D shows such an output image, to which rectangular bounding boxes having the determined coordinates and the predetermined shape are applied. In this image, the text objects "Campus" and "Shop" are isolated both from each other and from the rest of the image. As can be seen, the use of an edge mask layer reduces the issues arising from glued text objects. The output image 70 can then be used for many applications.

Based on the above, it would be clear to the person of skill in the art that the configurations of the segmentation module 30, the mask generation module 31, and the edge mask generation module 32, are not critical to the present invention. That is, the functions of any or all of these modules may be combined or further divided. For instance, a single neural network may be used both to segment the original image 20 and to generate a corresponding mask layer 41 and a corresponding edge mask layer 42.

Figure 5:
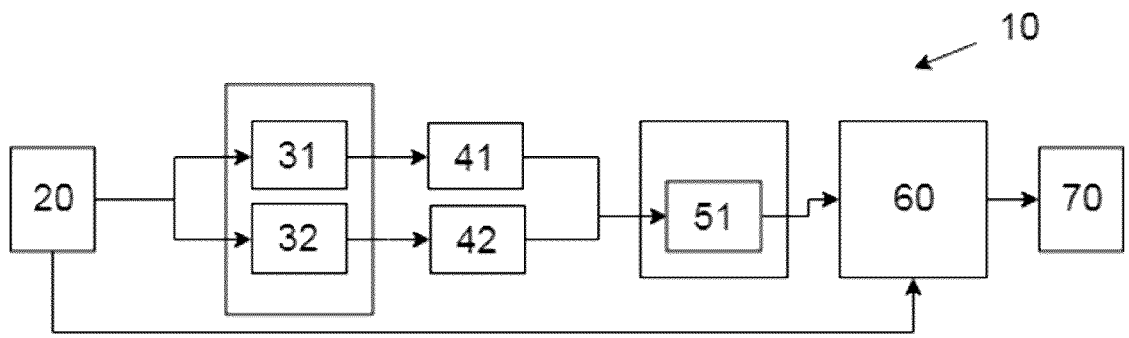
FIG. 5 is another block diagram illustrating yet another embodiment of the system of FIG. 1.

In another embodiment, as shown in FIG. 5, the bounding module 50 comprises a feature-extraction module 51. The mask layer 41 and the edge mask layer 42 are passed as input to this feature-extraction module 51. The feature-extraction module 51 generates at least one region that contains at least a portion of at least one object of interest. The bounding module 50 then 'focuses' on that at least one region and, based on that at least one region, determines coordinates for a predetermined shape. In a preferred implementation, the feature-extraction module 51 comprises a neural network. In embodiments of the system in which the bounding module 50 comprises a neural network, a stop flag may be introduced. The stop flag may be a maximum number of coordinate sets to be generated (i.e., a maximum number of objects of interest to be found in the original image). The stop flag may be predetermined or be generated by the segmentation module 30. The bounding module 30 'learns' to respond to this stop flag and pass the generated coordinate sets to the application module 60.

The present invention can also determine the angles of objects of interest within images, relative to the image as a whole. These angles may be determined by heuristic and/or rule-based systems, and/or by neural networks. The angle determination is based on the known predetermined shape, and on the coordinates determined by the bounding module 50.

EXAMPLE

A neural network implementation of the present invention was tested on images containing text objects in a variety of fonts, sizes, and colours. Additionally, this implementation of the present invention was tested both on document-like synthetic data and on real-world images of both text-rich and text-sparse scenes. This implementation achieved acceptable and very promising results against multiple benchmarks. In particular, the present invention achieves results comparable to the well-known 'faster rcnn' discussed above. Further, in light of the well-known dearth of annotated real-world data for training purposes, it is useful to note that the present invention's promising results on real-world data were achieved even though the test networks were primarily trained on synthetic data.

The specific neural network implementation chosen for testing used a single neural network as the segmentation module and a second neural network as the bounding module. The segmentation module's neural network, a modified form of the well-known fully convolutional network known as PSPNet, was trained to produce both a mask layer and an edge mask layer for each input image. The typical classifier and auxiliary loss terms of PSPNet were removed. Additionally, rather than the typical softmax function, the final layer of this modified PSPNet-based network performs a separate sigmoid function on each of the mask layer and the edge mask layer.

A particular loss function was used to train this neural network. (As is well-known in the art, a loss function is a mathematical function that indicates the difference between the expected result of a neural network and its actual result.) This loss function combines two loss function components, one for the mask layer and one for the edge mask layer.

The loss function component chosen for the mask layer portion of the overall loss function was a well-known function known as a "Dice loss function" (also known as a "similarity function", among other names). The Dice loss function is convenient for mask layer generation with its relatively consistent, predetermined shapes. The loss function component chosen for the edge mask layer portion of the overall loss function was the well-known "cross entropy loss" function. Cross entropy loss functions are better suited to the relative sparseness of an edge mask layer than the Dice loss function is.

Thus, the overall loss function for training this neural network can be written as:

$$L_{maskgen} = \text{Diceloss}(x_1, x_1^*) + \lambda^* \text{CrossEntropyLoss}(x_2, x_2^*), \quad (1)$$

where $x_1^*$ and $x_2^*$ are the actual values of the mask layer and the edge mask layer, respectively and $\lambda$ is a normalization factor to balance the two loss components.

In testing, the mask layer and the edge mask layer produced by the segmentation module were then passed to the bounding module. As noted above, in one implementation, this bounding module comprised a neural network. A heuristic implementation of the bounding module was also tested. Its performance was comparable with currently existing methods and techniques. However, the heuristic implementation occasionally produced false positives. That problem was reduced by the neural network implementation.

The neural network implementation of the bounding module used in these tests combined two different neural network architectures, one for 'encoding' and the other for 'decoding'. The 'encoding' portion functions as the feature-extraction module 51, discussed above. This module extracts features from the mask layer and the edge mask layer. In the implementation used in testing, the feature-extraction module was based on the well-known "VGG model architecture", which allows a strong inductive bias (see, for reference, Simonyan & Zisserman, "Very Deep Convolutional Networks for Large-Scale Image Recognition", arXiv: 1409.1556 [cs.CV], 2015, the entirety of which is herein incorporated by reference). In testing, the VGG-based model contained only convolutional layers, as opposed to convolutional layers and fully connected layers, as in the original VGG architecture. The encoding function can thus be formalized as follows:

$$F = \text{PretrainedVGG(mask layer, edge mask layer)} \quad (2)$$

For greater detail, again, refer to the Simonyan & Zisserman reference, above.

The 'decoding' portion of the bounding module implemented in testing was based on a 'recurrent neural network' architecture similar to that described in Wojna et al ("Attention-based Extraction of Structured Information from Street View Imagery", arXiv:1704.03549 [cs.CV], 2017, the entirety of which is herein incorporated by reference). This portion of the bounding module took the feature information extracted from the mask layer and edge mask layer (as described above), and determined coordinates for rectangles based on that information. The coordinates were returned in a tuple of the form ('top side location', 'left side location', 'rectangle width', 'rectangle height', 'angle of top side relative to x-axis of the image').

This 'decoding' process can be represented mathematically, using a 'spatial attention mask' as in Wojna et al, incorporated herein. The mathematical formalism used in the testing implementation is the same as that described in Wojna, Sections II.B and II.C, except that Equation 2 in Wojna was replaced with the following:

$$x_t = W_{u_t} \times u_{t-1} \quad (3)$$

Again, greater mathematical detail may be found in the Wojna reference.

Figure 7:
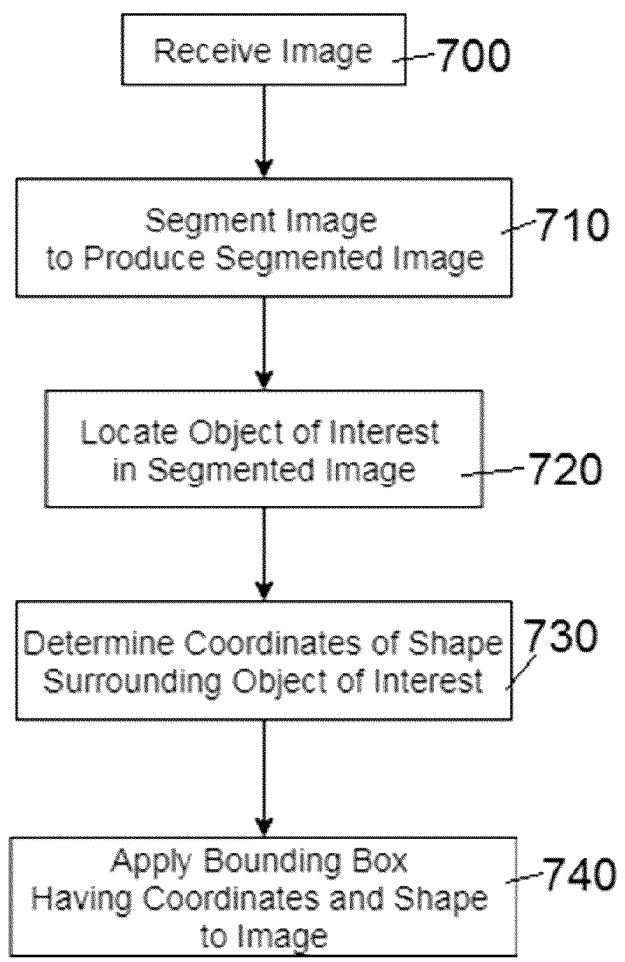
FIG. 7 is a flowchart detailing a method according to one aspect of the invention.

Referring now to FIG. 7, a flowchart detailing one embodiment of the invention is illustrated. At step 700, an input image is received. Then, at step 710, that input image is segmented to produce a segmented image. As discussed above, the segmentation may include pixel-wise classification and/or other segmentation methods. Next, at step 720, at least one object of interest in the segmented image is located. At step 730, coordinates of a predetermined shape that surround at least a portion of each object of interest are determined. Finally, at step 740, at least one bounding box having those coordinates, and having the predetermined shape, is applied to the original input image.

Figure 8:
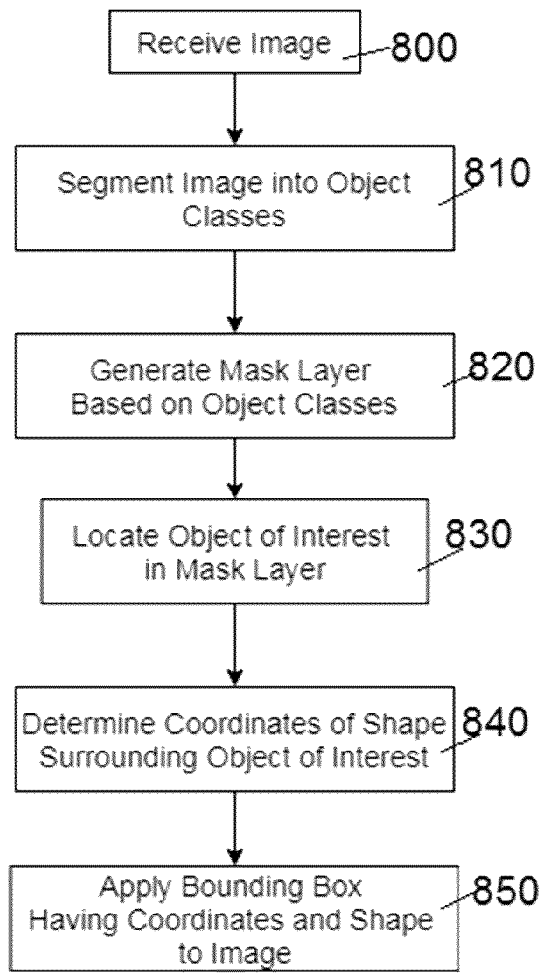
FIG. 8 is another flowchart, detailing an embodiment of the method of FIG. 7.

FIG. 8 is another flowchart, detailing another embodiment of the method of FIG. 7. At step 800, the input image is received. Then, at step 810, the image is segmented into object classes. At step 820, a mask layer is generated based on those object classes, and at least one object of interest is then located in the mask layer (step 830). The coordinates of the predetermined shape that surrounds at least a portion of each object of interest are determined at step 840. Then, at step 850, at least one bounding box having those coordinates, and having the predetermined shape, is applied to the original input image.

Figure 9:
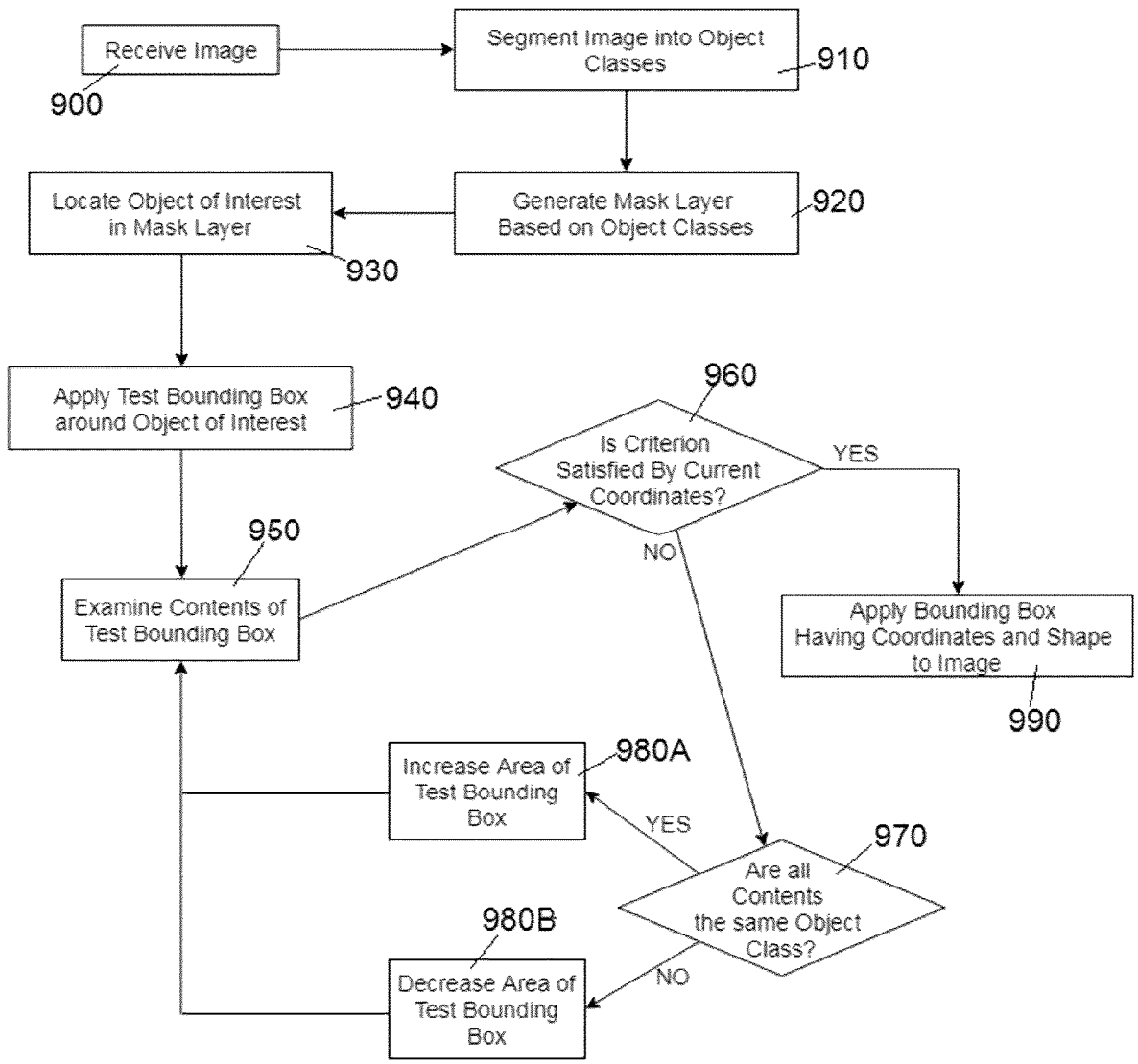
FIG. 9 is another flowchart detailing an embodiment of the method of FIG. 7.

FIG. 9 is a flowchart detailing an embodiment of the method of the present invention that uses the 'trial-and-error coordinate determination' process discussed above. The image is received at step 900 and segmented into object classes at step 910. Then, the mask layer is generated at step 920, and at least one object of interest is then located in the mask layer (step 930). Next, a test bounding box of random size that surrounds at least a portion of the at least one object of interest is applied to the mask layer (step 940). The contents of the test bounding box (i.e., the mask pixels contained in the test bounding box) are then examined at step 950. At step 960, the current coordinates of the test bounding box are evaluated against at least one criterion. If that at least one criterion is not satisfied, the object values of the test bounding box's contents are evaluated at step 970. Then, if all contents of the test bounding box are the same object class (i.e., if all pixels in the test bounding box have the same object value), the area of the test bounding box is increased at step 980A (thus also altering its coordinates). If, however, not all of the contents of the test bounding box are the same object class, the area of the test bounding box is decreased at step 980B, and its coordinates altered accordingly. The method then returns to step 950, where the contents of the current test bounding box are examined. This loop repeats until at least one criterion is satisfied at step 960. As discussed above, that at least one criterion may be related to the object values of the pixels within the test bounding box. The at least one criterion may also be a maximum number of iterations. Once the at least one criterion has been satisfied at step 960, the coordinates of the current test bounding box are used as the basis at step 990, where a bounding box having those coordinates and having the predetermined shape is applied to the original image.

Figure 10:
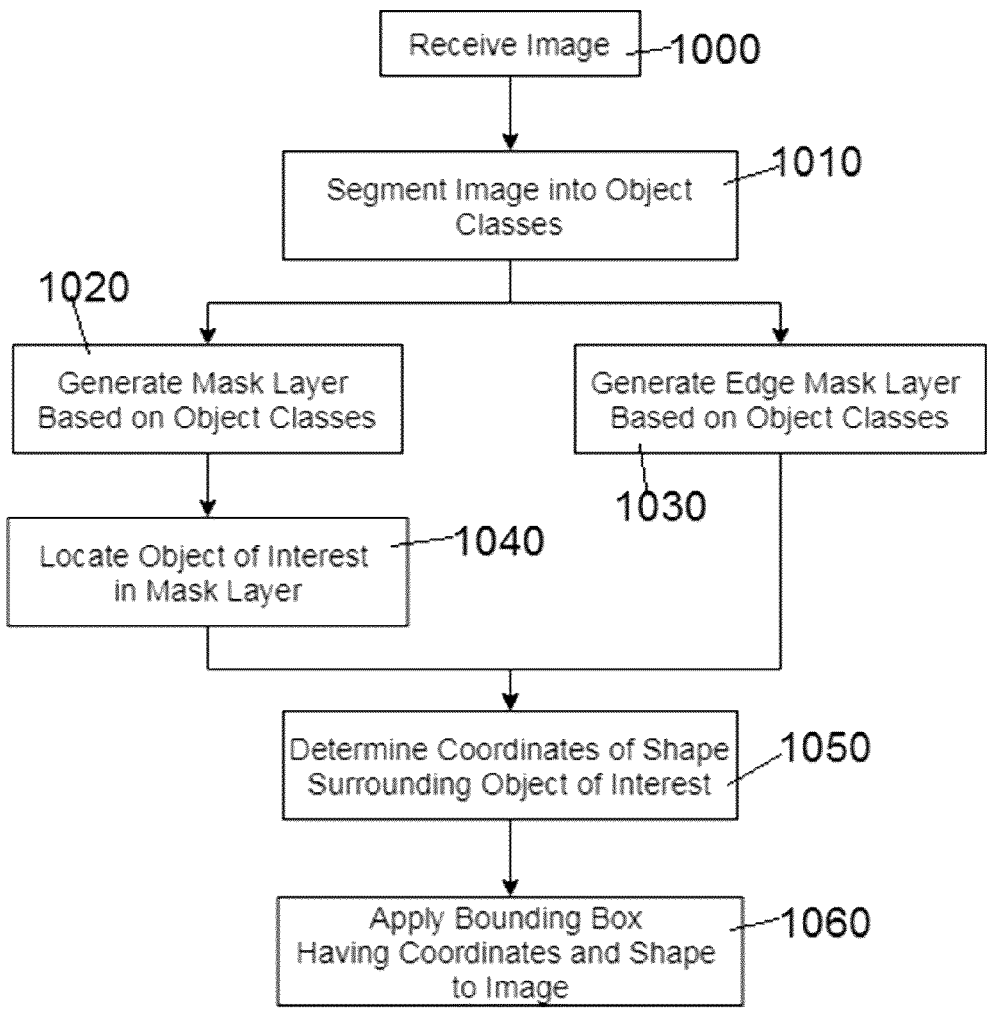
FIG. 10 is another flowchart detailing yet another embodiment of the method of FIG. 7.

FIG. 10 outlines yet another embodiment of the method of FIG. 7. Here, at step 1000, the input image is received. That image is segmented into object classes at step 1010. Following this segmentation step, the method branches into two paths. In the first path, at step 1020, a mask layer based on the object classes is generated as described above. Then, at step 1040, at least one object of interest is located in the mask layer. Step 1040 cannot occur until after step 1020 is performed. In the second path, an edge mask layer based on the object classes is generated (step 1030). Depending on the implementation, step 1030 may be performed at anytime between steps 1020 and 1050. At step 1050, both the mask layer and the edge mask layer are used to determine coordinates for a predetermined shape surrounding each at least one object of interest. Again, this step may be performed by rules-based or by neural network components. At step 1060, at least one bounding box having those coordinates and the predetermined shape is applied to the original input image.

Figure 11:
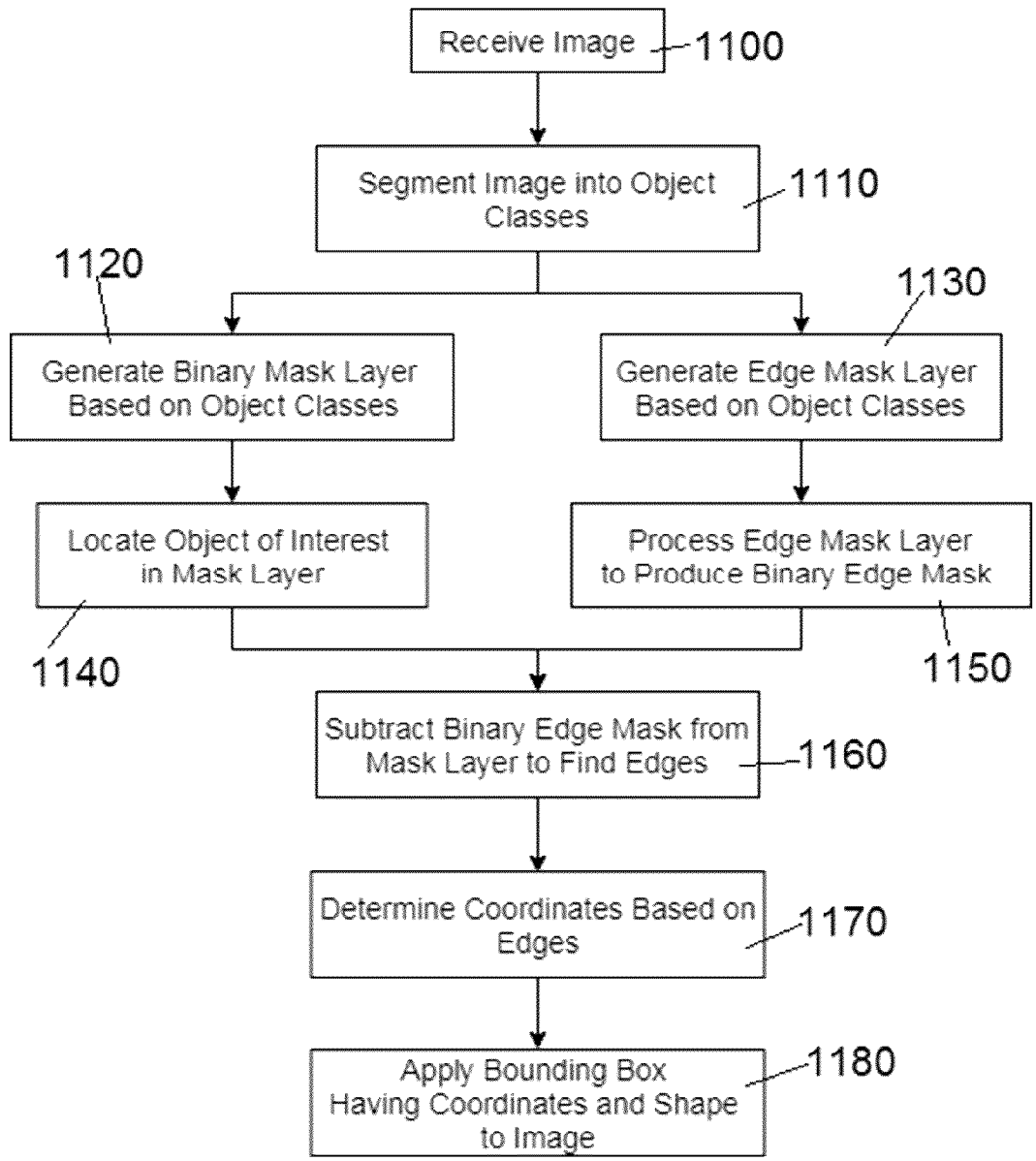
FIG. 11 is a flowchart detailing an embodiment of the method of FIG. 10.

The flowchart in FIG. 11 outlines a heuristic embodiment of the method in FIG. 10. At step 1100, the input image is received. That image is segmented into object classes at step 1110. The method then branches into two paths (1120/1140 and 1130/1150). In the first path, at step 1120, a binary mask layer based on the object classes is generated as described above. Then, at step 1140, at least one object of interest is located in that binary mask layer. In the second path, an edge mask layer based on the object classes is generated at step 1130. Then, at step 1150, the edge mask layer is processed to produce a binary edge mask, using the same binary values as the binary mask layer from step 1120. Step 1140 cannot occur until step 1120 has been performed. Likewise, step 1150 cannot occur until step 1130 has been performed. With that caveat, however, steps 1120 to 1150 may be performed in any other order. Both step 1140 and step 1150 must be completed before the method can move to step 1160.

At step 1160, the binary edge mask is subtracted from the binary mask layer to find edges of each of the at least one object of interest. Based on those edges, coordinates for a predetermined shape surrounding each at least one object of interest are determined at step 1170. Lastly step 1180, at least one bounding box having those coordinates and the predetermined shape is applied to the original input image.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refers to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for isolating at least one object of interest in an image, the method comprising:
   receiving said image;
   passing said image through a segmentation module to thereby produce a segmented image, wherein contents of said segmented image are classified into at least two object classes, and wherein said at least one object of interest is a member of one of said at least two object classes;

generating a mask layer based on said object classes, wherein said mask layer comprises mask pixels each corresponding to at least one image pixel of said image;

identifying a location of said at least one object of interest within said segmented image;

determining coordinates of a predetermined shape surrounding at least a portion of said at least one object of interest at said location by:

applying a test bounding box of random size to said mask layer, wherein said test bounding box has said predetermined shape and wherein said test bounding box surrounds said at least a portion of said object of interest;

determining object values for all mask pixels within said test bounding box;

increasing an area surrounded by said test bounding box to result in a larger bounding box when all of said mask pixels within said test bounding box have a predetermined object value, said predetermined object value being one of a first value and a second value;

decreasing an area surrounded by said test bounding box to result in a larger bounding box when at least one of said mask pixels within said test bounding box has a different object value, said different object value being another one of said first value and said second value; and determining said coordinates based on said test bounding box; and applying a bounding box having said predetermined shape and having said coordinates to said image, to thereby isolate said at least one object of interest from said image.

2. The method according to claim 1, wherein said at least one object of interest is text.

3. The method according to claim 1, wherein said shape is a parallelogram.

4. The method according to claim 3, wherein said shape is a rectangle.

5. The method according to claim 1, wherein said segmentation module comprises a neural network.

6. The method according to claim 1, wherein:
said image is an image array of image pixels;
each individual image pixel in said image array is classified into one of said at least two object classes, said classifying being based on a kind of object depicted by said individual image pixel;
said mask layer is a mask pixel array of mask pixels;
an object value is assigned to said each mask pixel; and
said object value for a specific mask pixel is a first value when at least one corresponding image pixel is a member of a predetermined first class; and said object value for said specific mask pixel is a second value when said at least one corresponding image pixel is a member of a predetermined second class.

7. The method according to claim 6, wherein passing said image through the segmentation module further comprises generating an edge mask layer, said edge mask layer being based on said object classes, and wherein said coordinates are determined based on said mask layer and on said edge mask layer.

8. The method according to claim 7, wherein said edge mask layer is an edge mask array of edge mask pixels, such that each edge mask pixel corresponds to at least one image pixel, and wherein:
an edge value is assigned to each edge mask pixel;

said edge value for a particular edge mask pixel is derived from an edge probability; and
said edge probability for said particular edge mask pixel is a probability that a corresponding particular image pixel in said image array is on an edge of said at least one object of interest.

9. The method according to claim 8, wherein determining the coordinates of the predetermined shape further comprises:
processing said edge mask layer to thereby produce a binary edge mask, said binary edge mask comprising binary pixels, wherein each binary pixel corresponds to an edge mask pixel, and wherein:
a binary pixel value of a specific binary pixel is said first value when, for a corresponding specific edge mask pixel, said edge probability is equal to or above an edge threshold;
said binary pixel value of said specific binary pixel is said second value when, for said corresponding specific edge mask pixel, said edge probability is below an edge threshold;
for each specific mask pixel of said mask layer, subtracting a corresponding binary pixel's binary pixel value from an object value of said specific mask pixel, to thereby identify edges of said at least one object of interest; and
determining said coordinates based on said edges.

10. The method according to claim 9, wherein said feature-extraction module is a neural network.

11. The method according to claim 10, wherein said neural network learns a maximum number of iterations to perform based on a predetermined number.

12. The method according to claim 7, wherein determining the coordinates of the predetermined shape further comprises:
passing said mask layer and said edge mask layer through a feature-extraction module to thereby generate at least one region containing at least a portion of said at least one object of interest; and
determining said coordinates based on said at least one region.

13. The method according to claim 1, wherein determining the coordinates of the predetermined shape further comprises using a neural network to determine said coordinates.

14. The method according to claim 1, wherein said coordinates correspond to a largest said predetermined shape that surrounds at least a portion of said object of interest, such that, when said largest said predetermined shape is applied to said mask layer, contents of said largest said predetermined shape meet at least one criterion, wherein said at least one criterion is related to said object classes.

15. The method according to claim 14, wherein each individual image pixel in said image array is classified into one of said at least two object classes, said classifying being based on a kind of object depicted by said individual image pixel, and wherein determining object values for all mask pixels within said test bounding box further comprises:
setting said object value for a specific mask pixel to the first value when at least one corresponding image pixel is a member of a predetermined one of said at least two classes; and
setting said object value for said specific mask pixel to the second value when said at least one corresponding image pixel is a member of a predetermined other one of said at least two classes.

16. The method according to claim 1, further comprising determining an angle of said at least one object of interest relative to at least one axis of said image, based on said predetermined shape and on said coordinates.

17. The method according to claim 1, wherein determining object values for all mask pixels within said test bounding box, increasing the area surrounded by said test bounding box, and decreasing the area surrounded by said test bounding box are repeated until an exit condition is reached, said exit condition being one of:
at least one predetermined criterion is met; and
a maximum number of iterations is reached.

18. A system for isolating at least one object of interest in an image, the system comprising:
a segmentation module for:
receiving said image and for segmenting said image to thereby produce a segmented image, wherein contents of said segmented image are classified into at least two object classes, wherein said at least one object of interest is a member of one of said at least two object classes; and
generating a mask layer wherein said mask layer is based on said object classes;
a bounding module for identifying a location of said at least one object of interest based on said segmented image and for determining coordinates of a predetermined shape surrounding at least a portion of said at least one object of interest at said location by;
applying a test bounding box of random size to said mask layer, wherein said test bounding box has said predetermined shape and wherein said test bounding box surrounds said at least a portion of said object of interest;
determining object values for all mask pixels within said test bounding box;
increasing an area surrounded by said test bounding box to result in a larger bounding box when all of said mask pixels within said test bounding box have a predetermined object value, said predetermined object value being one of a first value and a second value;
decreasing an area surrounded by said test bounding box to result in a larger bounding box when at least one of said mask pixels within said test bounding box has a different object value, said different object value being another one of said first value and said second value; and
determining said coordinates based on said test bounding box; and
an application module for applying a bounding box having said predetermined shape and having said coordinates to said image, to thereby isolate said at least one object of interest from said image.

19. The system according to claim 18, wherein said segmentation module further comprises an edge mask generation module for generating an edge mask layer, said edge mask layer being based on said object classes, and wherein said bounding module determines said coordinates based on said mask layer and on said edge mask layer.

20. The system according to claim 18, wherein said segmentation module comprises a neural network.

21. The system according to claim 18, wherein said bounding module comprises at least one neural network.

22. The system according to claim 18, wherein said bounding module is further for determining an angle of said at least one object of interest relative to at least one axis of said image, based on said predetermined shape and on said coordinates.

23. Non-transitory computer-readable media having encoded thereon computer-readable and computer-executable instructions that, when executed, implement a method for isolating at least one object of interest in an image, the method comprising:
receiving said image;
passing said image through a segmentation module to thereby produce a segmented image, wherein contents of said segmented image are classified into at least two object classes, and wherein said at least one object of interest is a member of one of said at least two object classes;
identifying a location of said at least one object of interest within said segmented image;
determining coordinates of a predetermined shape surround at least a portion of said object of interest at said location by:
applying a test bounding box of random size to said mask layer, wherein said test bounding box has said predetermined shape and wherein said test bounding box surrounds said at least a portion of said object of interest;
determining object values for all mask pixels within said test bounding box;
increasing an area surrounded by said test bounding box to result in a larger bounding box when all of said mask pixels within said test bounding box have a predetermined object value, said predetermined object, value being one of first value and a second value;
decreasing an area surrounded by said test bounding box to result in a larger bounding box when at least one of said mask pixels within said test bounding box has a different object value said different object value being another one of said first value and said second value; and
determining said coordinates based on said test bounding box; and
applying a bounding box having said predetermined shape and having said coordinates to said image, to thereby isolate said at least one object of interest from said image.

* * * * *